United States Patent [19]

Hordon et al.

[11] Patent Number: 4,780,386

[45] Date of Patent: Oct. 25, 1988

[54] SELENIUM ALLOY TREATMENT

[75] Inventors: Monroe J. Hordon, Pittsford; Alan B. Mistrater, Rochester; Lawrence E. Kowalczyk, Webster, all of N.Y.

[73] Assignee: Xerox Corporation, Stamford, Conn.

[21] Appl. No.: 935,907

[22] Filed: Nov. 28, 1986

[51] Int. Cl.[4] .......................... G03G 5/10; C01B 19/00

[52] U.S. Cl. .......................................... 430/58; 430/128; 75/228; 423/510

[58] Field of Search ..................... 430/58, 128; 75/228; 423/510

[56] References Cited

U.S. PATENT DOCUMENTS

| | | | |
|---|---|---|---|
| 3,524,745 | 8/1970 | Cerlon et al. | 96/1.5 |
| 3,607,363 | 9/1971 | Sadamatsu | 430/135 |
| 3,911,091 | 10/1975 | Karam | 423/510 |
| 4,205,098 | 5/1980 | Kobayashi et al. | 427/76 |
| 4,297,424 | 10/1981 | Hewitt | 430/58 |
| 4,554,230 | 11/1985 | Foley et al. | 430/58 |
| 4,609,605 | 9/1986 | Lees et al. | 430/58 |

*Primary Examiner*—John Goodrow
*Attorney, Agent, or Firm*—Peter H. Kondo

[57] ABSTRACT

A process for preparing an electrophotographic imaging member comprising providing large particles of an alloy comprising selenium, tellurium and arsenic, the large particles having an average particle size of at least about 300 micrometers and an average weight of less than about 1000 mg, mechanically abrading the surfaces of the large particles while maintaining the substantial surface integrety of the large particles to form between about 3 percent by weight to about 20 percent by weight dust particles based on the total weight of the alloy prior to mechanical abrasion.

14 Claims, 2 Drawing Sheets

SELENIUM ALLOY TREATMENT

BACKGROUND OF THE INVENTION

The present invention relates in general to treatment of a selenium alloy for electrophotographic imaging members.

The formation and development of images on the imaging surfaces of electrophotographic imaging members by electrostatic means is well known. One of the most widely used process being xerography described, for example, in U.S. Pat. No. 2,297,691 to Chester Carlson. Numerous different types of photoreceptors can be used in electrophotographic imaging process. Such electrophotographic imaging members may include inorganic materials, organic materials, and mixtures thereof. Electrophotographic imaging members may comprise contiguous layers in which one or more of the layers performs a charge generation function and the other layer forms a charge carrier transport function or may comprise a single layer which performs both the generation and transport functions. These electrophotographic imaging members may be coated with a protective overcoating to improve wear. For Carlson type electrophotographic imaging processes, the protective overcoating must allow the electrostatic charge initially deposited on the outer surface of the overcoating to form at the interface between the protective overcoating and the underlying photoconductive layer prior to repeating the next imaging cycle. Protective overcoatings may be of various organic and inorganic materials including resins, photoconductive materials and the like.

Electrophotographic imaging members based on amorphous selenium have been modified to improve panchromatic response, increase speed and to improve color copyability. These devices are typically based on alloys of selenium with tellurium. The selenium electrophotographic imaging members may be fabricated as single layer devices comprising a selenium-tellurium alloy layer which performs both charge generation and charge transport functions. The selenium electrophotographic imaging members may also contain multiple layers such as, for example, a selenium alloy transport layer and a contiguous selenium-tellurium alloy generator layer.

A common technique for manufacturing photoreceptor plates involves vacuum deposition of a selenium-tellurium alloy to form an electrophotographic imaging layer a substrate. Tellurium is incorporated as an additive for the purpose of enhancing the spectral sensitivity of the photoconductor. Typically, the tellurium addition is incorporated as a thin selenium-tellurium alloy layer deposited over a selenium alloy base layer. Fractionation of the tellurium composition during evaporation results in a gradient in the deposited selenium-tellurium alloy layer during vacuum evaporation. A key element in the fabrication of tellurium doped photoreceptors is the control of fractionation of tellurium during the evaporation of the selenium-tellurium alloy layers. Tellurium fractionation control is particularly important because the local tellurium concentration at the extreme top surface of the structure, denoted as top surface tellurium, directly affects xerographic sensitivity and copy quality.

One method of preparing selenium tellurium alloys for evaporation is to grind selenium-tellurium alloy shot (beads) and compress the ground material into pellet agglomerates, typically 150–300 mg. in weight and having an average diameter of about 6 millimeters (6,000 micrometers). The pellets are evaporated from crucibles in a vacuum coater using a time/temperature crucible designed to minimize the fractionation of the alloy during evaporation. One shortcoming of the selenium-tellurium alloy layer in a photoreceptor structure is the propensity of the selenium-tellurium alloy at the surface of the layer to crystallize under thermal exposure in machine service. To retard premature crystallization and extend photoreceptor life, the addition of up to about 1 percent arsenic to the selenium-tellurium alloy was found beneficial without impairment of xerographic performance. It was found that the addition of arsenic to the composition employed to prepare the pellet impaired the capability of the process to control tellurium fractionation. Selenium-tellurium-arsenic pellets produced by the pelletizing process exhibited a wider variability of top surface tellurium concentrations compared to selenium-tellurium pellets. This wider variability of top surface tellurium concentrations was manifested by a correspondingly wider distribution of photoreceptor sensitivity values than selenium-tellurium alloy pellets. In an extended photoreceptor fabrication run, up to 50 percent of the selenium-tellurium-arsenic pellets were rejected for forming high top surface tellurium concentrations which caused excessive sensitivity in the final photoreceptor.

PRIOR ART STATEMENT

In U.S. Pat. No. 4,609,605 to Lees et al a multilayered electrophotographic imaging member is disclosed in which one of the layers my comprise a selenium-tellurium-arsenic alloy. The alloy can be prepared by grinding selenium-tellurium-arsenic alloy beads, with or without halogen doping, preparing pellets having an average diameter of about 6 mm from the ground material, and evaporating the pellets in crucibles in a vacuum coater. Although excellent photoreceptors are prepared by this process, the addition of increasing amounts of arsenic presented greater difficulties in controlling tellurium fractionation such that wide variation in photoreceptor sensitivity were observed in ternary pellet compositions containing selenium, tellurium and up to about 1 percent by weight arsenic.

In U.S. Pat. No. 4,297,424 to Hewitt a process is disclosed for preparing a photoreceptor wherein the selenium-tellurium-arsenic alloy shot is ground, formed into pellets and vacuum evaporated. Although acceptable photoreceptors are prepared by this process, like the electrophotographic imaging members of U.S. Pat. No. 4,609,605 above, control of electrical sensitivity of the photoreceptor can be marginal for many applications. For applications requiring improved electrical sensitivity control, dependent in turn on tight control of tellurium fractionation, the addition of increasing amounts of arsenic presented greater difficulties in precisely controlling tellurium fractionation and photoreceptor sensitivity when employing ternary pellet compositions containing selenium, tellurium and up to about 1 percent by weight arsenic.

In U.S. Pat. No. 4,554,230 to Foley et al a method is disclosed for fabricating a photoreceptor wherein the selenium-arsenic alloy bead is ground, formed into pellets and vacuum evaporated. The process of this patent does not apply to selenium-tellurium-arsenic alloys.

In U.S. Pat. No. 4,205,098 to Kobayashi et al a method for producing selenium pellets is disclosed wherein selenium or selenium and additives are formed into powder and then compacted into pellets and vacuum evaporated. The additives may include tellurium and arsenic. Although not specifically mentioned the simultaneous addition of tellurium and arsenic to selenium will present difficulties in controlling tellurium fractionation and photoreceptor sensitivities where the ternary pellet compositions contain selenium, tellurium and up to 1 percent by weight arsenic.

In U.S. Pat. No. 3,524,754 to Cerlon et al a process is disclosed for preparing a photoreceptor wherein selenium-arsenic-antimony alloys are ground into fine particles and vacuum evaporated. The process of this patent does not apply to compacted pellets of selenium-tellurium-arsenic alloys.

In U.S. Pat. No. 3,911,091 to Karem et al a method is disclosed for fabricating a photoreceptor incorporating trigonal selenium particles in an organic binder material. The process of this patent does not apply to selenium-tellurium-arsenic alloys.

Generally, prior alloy preparation techniques exhibit deficiencies such as precise control of tellurium fractionation in the outer layer of the photoreceptor film which in turn affects the value and range of electrical sensitivity of the photoreceptor film to light. Photoreceptors containing large batch to batch top surface tellurium concentrations tend to exhibit correspondingly large batch to batch variations in sensitivity to light which is unacceptable in high speed precision copiers, duplicators and printers because of copy quality variation, particularly during long length runs where, for example, the quality should be uniform from the first copy to thousands of copies. Modern sophisticated, high speed copiers, duplicators and printers are constrained by narrow operating windows that require photoreceptors having precise, predictable operating characteristics.

Thus, there is a need for an improved process for preparing photoreceptors containing selenium-tellurium-arsenic alloy layers.

SUMMARY OF THE INVENTION

Accordingly, it is an object of the present invention to provide an improved process for preparing selenium-tellurium-arsenic alloy materials for electrophotographic imaging member which overcomes the the above-noted disadvantages.

It is a further object of the present invention to provide an improved process which controls tellurium fractionation within narrower limits.

It is a further object of the present invention to provide an improved process which controls the sensitivity of photoreceptors to light within narrower limits.

It is a further object of the present invention to provide an improved process which increases photoreceptors fabrication yields.

It is a further object of the present invention to provide an improved process which reduces the level of tellurium fractionation.

It is a further object of the present invention to provide an improved process which reduces the tellurium distribution variation through the thickness of a selenium-tellurium-arsenic photoconductive layer.

The above objects and others are accomplished in accordance with the present invention by a process for preparing an electrophotographic imaging member comprising providing large particles of an alloy comprising selenium, tellurium and arsenic, the large particles having an average particle size of at least 300 micrometers and an average weight of less than about 1000 mg, mechanically abrading the surfaces of the large particles while maintaining the substantial surface integrity of the large particles to form between about 3 percent by weight to about 20 percent by weight dust particles of the alloy based on the total weight of the alloy prior to mechanical abrasion. The alloy dust particles are substantially uniformly compacted around the outer periphery of the large particles of the alloy. The large particles of the alloy may be beads of the alloy having an average particle size of between about 300 micrometers and about 3,000 micrometers or pellets having an average weight between about 50 mg and about 1000 mg, the pellets comprising compressed finely ground particles of said alloy having an average particle size of less than about 200 micrometers prior to compression. In one preferred embodiment, the process comprises mechanically abrading the surfaces of beads of an alloy comprising selenium, tellurium and arsenic having an average particle size of between about 300 micrometers and about 3,000 micrometers while maintaining the substantial surface integrity of said beads to form a minor amount of dust particles of the alloy, the dust particles having an average particle size of less than about 10 micrometers, grinding the beads and the dust particles to form finely ground particles of the alloy having an average particle size of less than about 200 micrometers, and compressing the ground particles into pellets having an average weight between about 50 mg and about 100 mg. In another embodiment, mechanical abrasion of the surface of the pellets after the pelletizing step may be substituted for mechanical abrasion of the beads. More specifically, the above objects and others can be accomplished with the present with this latter embodiment by providing beads of an alloy comprising selenium, tellurium and arsenic having an average particle size of between about 300 micrometers and about 3,000 micrometers, grinding the beads to form finely ground particles of the alloy having an average particle size of less than about 200 micrometers, compressing the ground particles into pellets having an average weight between about 50 mg and about 1000 mg, and mechanically abrading the surface of the pellets to form alloy dust particles while maintaining the substantial surface integrity of the pellets the alloy dust particles having an average particle size of less than about micrometers and comprising from about 3 percent by weight to about 20 percent by weight of the alloy, based on the total weight of the pellets prior to mechanical abrading of the surface of pellets. If desired, the process of this invention may include both the steps of mechanically abrading the surface of the beads and mechanically abrading the surface of the pellets. The selenium-tellurium-arsenic alloy in the pellets may then be vacuum deposited to form a photoconductive layer of an electrophotographic imaging member which comprises a substrate and, optionally, one or more other layers.

The electrophotographic imaging member prepared by the process of this invention may be employed in a process involving depositing a substantially uniform positive electrostatic charge on the electrophotographic imaging member, exposing the electrophotographic imaging member to an imagewise pattern of electromagnetic radiation to which the selenium-tellurium-arsenic alloy is responsive whereby an electrostatic latent image is formed on the electrophotographic imaging member, developing the electrostatic latent image with electrostatically attractable toner particles to form a toner particle deposit in image configuration, transferring the toner particle deposit to a receiving member, and subjecting the electrophotographic imaging member to uniform light discharge. The process may be repeated numerous times in an automatic device.

The substrate may be opaque or substantially transparent and may comprise numerous suitable materials having the required mechanical properties. The entire substrate may comprise the same material as that in the electrically conductive surface or the electrically conductive surface may merely be a coating on the substrate. Any suitable electrically conductive material may be employed. Typical electrically conductive materials include, for example, aluminum, titanium, nickel, chromium, brass, stainless steel, copper, zinc, silver, tin, and the like. The conductive layer may vary in thickness over substantially wide ranges depending on the desired use of the electrophotoconductive member. Accordingly, the conductive layer may generally range in thickness from about 50 Angstrom units to many centimeters. When a flexible electrophotographic imaging member is desired, the thickness may be between about 100 Angstrom units to about 750 Angstrom units. The substrate may be of any other conventional material including organic and inorganic materials. Typical substrate materials include insulating non-conducting materials such as various resins known for this purpose including polyesters, polycarbonates, polyamides, polyurethanes, and the like. The coated or uncoated substrate may be flexible or rigid and may have any number of configurations such as, for example, a plate, a cylindrical drum, a scroll, an endless flexible belt, and the like. The outer surface of the supporting substrate preferably comprises a metal oxide such as aluminum oxide, nickel oxide, titanium oxide, and the like.

In some cases, intermediate adhesive layers between the substrate and subsequently applies layers may be desirable to improve adhesion. If such adhesive layers are utilized, they preferably have a dry thickness between about 0.1 micrometer to about 5 micrometers. Typical adhesive layers include et. al. film-forming polymers such as polyester, polyvinylbutyral, polyvinylpyrolidone, polycarbonate, polyurethane, polymethylmethacrylate, and the like and mixtures thereof. Since the surface of the supporting substrate may be a metal oxide layer or an adhesive layer, the expression "supporting substrate" as employed herein is intended to include a metal oxide layer with or without an adhesive layer on a metal oxide layer.

Any suitable selenium-tellurium-arsenic alloy photoconductive layer material may be employed. Typical photoconductive selenium-tellurium-arsenic alloy photoconductive materials include selenium-tellurium-arsenic alloys with or without a halogen dopant, and the like. The selenium-tellurium-arsenic alloy may be applied to the coated or uncoated substrate alone as the only photoconductive layer or it may be used in conjunction with one or more other layers such as a selenium transport layer and/or a protective overcoat layer. The selenium-tellurium-arsenic alloy may may comprise between about 5 percent by weight and about 45 percent by weight tellurium, between about 0.1 percent by weight, about 5 percent by weight arsenic and a halogen selected from the group consisting of up to about 70 parts per million by weight of chlorine and up to about 140 parts per million by weight of iodine all based on the total weight of the alloy with the remainder being selenium. The expression "selenium-tellurium-arsenic alloy" is intended to include halogen doped alloys as well as alloys not doped with halogen. The selenium-tellurium-arsenic alloy photoconductive layer is frequently employed as a charge generation layer in combination with a charge transport layer. The charge transport layer is positioned between the supporting substrate and the charge generating selenium-tellurium-arsenic photoconductive alloy layer. The photoconductive charge generating selenium-tellurium-arsenic alloy layer should comprise between about 5 percent by weight and about 20 percent by weight tellurium, between about 0.1 percent by weight and about 4 percent by weight arsenic, a halogen selected from the group consisting of up to about 70 parts per milliion by weight of chlorine and up to about 140 parts per million by weight of iodine with the remainder being selenium. Optimum results are achieved with charge generation layers containing between about 10 percent by weight and about 13 percent by weight tellurium, between about 0.5 percent by weight and about 2 percent by weight arsenic and less than about 15 parts per million by weight chlorine with the remainder being selenium. Concentrations of tellurium exceeding about 20 percent by weight lead to excessive photoreceptor light sensitivity and high dark decay and concentrations of tellurium less than about 5 percent by weight results in low light sensitivity and loss of copy quality. When the concentration of arsenic exceeds about 4 percent by weight, the photoreceptor experiences excessive dark decay. The resistance of amorphous selenium photoreceptors to thermal crystallization and surface wear begins to degrade as the concentration of arsenic drops below about 0.1 percent by weight. As the chlorine content rises above about 70 parts per million by weight chlorine, the photoreceptor begins to exhibit excessive dark decay.

Any suitable selenium transport layer may be utilized. The charge transport material may, for example, comprise pure selenium, selenium-arsenic alloys, selenium-arsenic-halogen alloys, selenium-halogen and the like. Preferably, the charge transport layer comprises a halogen doped selenium arsenic alloy. Generally, about 10 parts by weight per million to about 200 parts by weight per milliion of halogen is present in a halogen dope doped selenium charge transport layer. If a halogen doped transport layer free of arsenic is utilized, the halogen content should be less than about 20 parts by weight per million. Inclusion of high levels of halogen in a thick halogen doped selenium charge transport layer free of arsenic leads to excessive dark decay because dark decay is substantially a function of the total chlorine in a multilayer imaging member. Imaging members containing high levels of halogen in a thick halogen doped selenium charge transport layer free of arsenic are described, for example, in U.S. Pat. No. 3,635,705 to Ciuffini, U.S. Pat. No. 3,639,120 to Snelling, and Japanese Patent Publication No. J5 61 42-537 to Ricoh, published June 6, 1981. Generally, halogen doped selenium arsenic alloy charge transport layers comprise between about 99.5 percent by weight to about 99.9 percent by weight selenium, about 0.1 percent to about 0.5 percent by weight arsenic and between about 10 parts per million by weight to about 200 parts per million by weight of halogen, the latter halogen concentration being a nominal concentration. The expression "nominal halogen concentration" is defined as the halogen concentration in the alloy evaporated in the crucible. The thickness of the charge transport layer is generally between about 15 micrometers and about 75 micrometers. The expression "halogen materials" is intended to include fluorine, chlorine, bromine, and iodine. Chlorine is the preferred halogen because of the ease of handling and the stability of chlorine in the film (apparently due to lack of out diffusion). Transport layers are well known in the art. Typical transport layers are described, for example, in U.S. Pat. No. 4,609,605 to Lees et al and in U.S. Pat. No. 4,297,424 to Hewitt, the entire disclosures of these patents being incorporated herein by reference.

The transport layer can be deposited by any suitable conventional technique, such as vacuum evaporation. Thus, a transport layer comprising a halogen doped selenium-arsenic alloy may be evaporated by conventional vacuum coating devices to form the desired thickness. The amount of alloy to be employed in the evaporation boats of the vacuum coater will depend on the specific coater configuration and other process variables to achieve the desired transport layer thickness. Chamber pressure during evaporation may be on the order of about $4\times10^{-5}$ torr. Evaporation is normally completed in about 15 to 25 minutes with the molten alloy temperature ranging from about 250° C. to about 325° C. Other times and temperatures and pressures outside these ranges may be used as well understood by those skilled in the art. It is generally desirable that the substrate temperature be maintained in the range of from about 50° C. to about 70° C. during deposition of the transport layer. Additional details for the preparation of transport layers are disclosed, for example, in U.S. Pat. No. 4,297,424 to H. Hewitt.

If desired, an interface layer may be positioned between the transport layer and the charge generating selenium-tellurium-arsenic photoconductive layer. The interface layer material may consist essentially of selenium and a nominal halogen concentration of about 50 parts by weight per million to about 2,000 parts by weight per million halogen material with the remainder comprising selenium. Minor additions of arsenic might be added but are relatively undesirable and may require additional halogen to compensate for this arsenic addition. The expression "nominal halogen concentration" is defined as the halogen concentration in the alloy evaporated in the crucible. The halogen concentration in the deposited interface layer will typically be somewhat less than that in the alloy evaporated in the crucible. In order to achieve optimal device properties, the actual halogen content in any final interface layer should be greater than about 35 parts by weight per million. Inclusion of high levels of halogen in thick halogen doped selenium layers free of arsenic leads to excessive dark decay because dark decay is substantially a function of the total halogen in a multilayer imaging member. Imaging members containing high levels of halogen in a thick halogen doped selenium charge transport layer free of arsenic are described, for example, in U.S. Pat. No. 3,635,705 to Ciuffini, U.S. Pat. No. 3,639,120 to Snelling, and Japanese Patent Publication No. J5 61 42-537 to Ricoh, published June 6, 1981. The use of interface layers is described in U.S. Pat. No. 4,554,230 to Foley et al, the entire disclosure of which is incorporated herein by reference.

Generally, the selenium-tellurium-arsenic alloy components are combined by melting the selenium and arsenic together by any suitable conventional technique. The molten selenium-tellurium-arsenic alloy is then shotted by any suitable method. Shotting is usually effected by quenching molten droplets of the alloy in water to form large particles of alloy in the form of shot or beads. Shotting processes for forming alloy beads are well known and described, for example, in U.S. Pat. No. 4,414,179 to S. Robinette, the entire disclosure of this patent being incorporated herein by reference. The alloy beads may have an average particle size of, for example, between about 300 micrometers and about 3,000 micrometers.

Unlike prior processes where the alloy beads formed by shotting are all rapidly ground into fine particles in about 4 or 5 minutes in a high speed grinder to form fine particles suitable for pelletizing, the alloy beads in the process of this invention are, in one embodiment, mechanically abraded while maintaining the substantial surface integrity of the beads to form a minor amount of dust particles from the alloy beads. To achieve precise control of sensitivity and tellurium fractionation, this mechanical abrasion treatment of alloy beads must be used if the pellets do not undergo the mechanical abrasion treatment embodiment of this invention subsequent to pelletizing. This "minor amount" of alloy dust particles comprises between about 3 percent by weight to about 20 percent by weight of the total weight of the alloy prior to mechanical abrasion. Generally, alloy dust particles are created by imparting a vigorous tumbling action to the bead particles. Although the bead particles impact each other and against the mechanical device that imparts the tumbling or other suitable abrasive movement to the particles the abrasive action should be sufficient to create dust particles having an average particle size of less than about 10 micrometers while avoiding any substantial crushing of the bead particles. More specifically, substantial surface integrity (i.e. bead shape) of the beads is maintained when less than about 20 percent by weight of the alloy beads, based on the weight of the total alloy, is fractured during the period when the beads are mechanically abraded to form the alloy dust. In other words, although the surface of the beads may be pitted and nicked, the overall bead shape is substantially conserved for at least about 80 percent by weight of the alloy beads. The time that the alloy beads should be mechanically abraded depends upon numerous factors such as the quantity of alloy dust desired, the size of the alloy bead batch, the type of device employed to impart mechanical abrasion to the beads, and the like. For effectively controlling tellurium variation as well as the overall tellurium fractionation and distribution, the abrasion time should be sufficient to create between about 3 percent by weight to about 20 percent by weight alloy dust particles having an average particle size of less than about 10 micrometers while maintaining the substantial surface integrity of the bead particles. The alloy dust particles adhere to the surface of the bead particles much like toner particles adhere to the surface of carrier particles in two component electrophotographic developer mixtures and are substantially uniformly compacted around the outer periphery of bead particles. Any suitable device may be utilized to mechanically abrade the alloy beads and form the alloy dust particles. Typical devices for mechanically abrading particles by tumbling include vaned roll blenders, vibrating tubs, conical screw mixers, V-shaped twin shell mixers, double-cone blenders, and the like.

The alloy beads, or combination of the alloy beads and minor amount of dust particles formed if vigorous mechanical abrasion of the alloy beads is employed, is thereafter rapidly ground in a conventional high speed grinder or attritor to form alloy particles having an average particle size of less than about 200 micrometers. Any suitable grinding device may be utilized to pulverize the bead particles to form the fine alloy particles having an average particle size of less than about 200 micrometers. Typical grinders include hammer mills, jet pulverizers, disk mills, and the like. Depending upon the efficiency of the grinding device employed, grinding alloy beads to form alloy particles having an average particle size of less than about 200 micrometers can normally be accomplished in less than about 5 minutes. Longer grinding times may be employed, if desired.

After grinding, the fine alloy particles having an average particle size of less than about 200 micrometers are compressed by any suitable technique into large particles of alloy usually referred to as pellets having an average weight between about 50 mg and about 1000 mg. A pellet weight greater than about 50 mg is preferred for ease of handling. When the pellet weight exceeds about 1000 mg evaporation discontinuities are observed. The pellets may be of any suitable shape. Typical shapes include cylinders, spheres, cubes, tablets, and the like. Compression of the alloy particles into pellets may be accomplished with any suitable device such as, for example, a simple punch tabletting press, a multi punch rotary tabletting press, and the like.

If the alloy beads are not mechanically abraded prior to grinding, the pellets must be tumbled mechanically abraded after the pelletizing step to reduce the range of tellurium fractionation. Alternatively, if desired, the process of this invention may include both mechanical abrasion of the alloy beads prior to grinding and mechanical abrasion of the pellets after the pelletizing step. The mechanical abrasion or tumbling action imparted to the pellets is preferably sufficient to create a minor amount of dust particles having an average particle size of less than about 10 micrometers while maintaining the substantial surface integrity of the pellets. The expression "minor amount" of alloy dust particles is defined as between about 3 percent by weight and about 20 percent by weight dust particles based on the total weight of the original pellets prior to tumbling. The expression "substantial integrity of the pellets' is defined herein as the fracturing of less than about 5 percent of the pellets. In other words, although some pellets may crack or fracture during tumbling, most, if not all, of the pellets remain unbroken during tumbling. Thus, although the surface of the pellets may be pitted and nicked, the overall pellet shape is substantially conversed. To achieve greater control over tellurium fractionation, the pellets are preferably tumbled until between about 3 percent by weight and about 20 percent by weight of alloy dust particles are formed having an average particle size of less than about 10 micrometers while maintaining substantial integrity of the pellets. The alloy dust particles adhere to the surface of the pellets much like the dust adheres to the tumbled alloy bead particles and are substantially uniformly compacted around the outer periphery of the pellets. Any suitable device may be utilized to tumble the pellets to form the alloy dust particles. Typical devices for tumbling particles include vaned roll blenders, vibrating tubs, conical screw mixers, V-shaped twin shell mixers, double-cone blenders, and the like.

The pellets may then be evaporated from crucibles in a vacuum coater using a time/temperature crucible designed to minimize the fractionation of the alloy during evaporation. In a typical crucible evaporation program, the selenium-tellurium-arsenic generating layer is formed in about 12 to about 30 minutes during which time the crucible temperature is increased from about 20° C. to about 385° C. Additional details for the preparation of generating layers are disclosed, for example, in U.S. Pat. No. 4,297,424 to H. Hewitt, the entire disclosure thereof being incorporated herein by reference. Satisfactory results may be achieved with a selenium-tellurium-arsenic alloy photoconductive generating layer having a thickness between about 1 micrometer and about 20 micrometers. The selenium-tellurium-arsenic alloy of photoreceptor of this invention provides all the required photographic responses as well as extending photoreceptor life. Selenium-tellurium-arsenic alloy generating layers having a thickness greater than about 20 micrometers generally induce excessive arsenic and tellurium fractionation control difficulties during photoreceptor fabrication. Thickness less than about 1 micrometer tend to wear too rapidly in automatic electrophotographic copiers, duplicators and printers. Optimum results are achieved with generating layers having a thickness between about 3 micrometers and about 7 micrometers.

BRIEF DESCRIPTION OF THE DRAWINGS

A more complete understanding of the process and device of the present invention can be achieved by reference to the accompanying drawings wherein:

Referring to FIG. 1 a multilayered electrophotographic imaging member 10 is is illustrated comprising a substrate 12, a transport layer 14 comprising a selenium-arsenic alloy layer and a generating layer 16 comprising an alloy of selenium-tellurium. The substrate 12 may comprise any suitable material having the required mechanical properties. Typical substrates include aluminum, nickel and the like. The thickness of the substrate layer is dependent upon many factors including economic considerations, design of the device in which the electrophotographic imaging is to be used, and the like. Thus, the substrate may be of substantial thickness, for example, up to about 5,000 micrometers, or of minimum thickness such as about 100 micrometers. The substrate may be flexible or rigid and may have different configurations as described above. The transport layer 14 comprises a selenium-arsenic alloy, however, other alloys may also be used. The percent of selenium present in this ally may range fron about 99.5 percent to about 99.9 percent by weight and the percentage of arsenic present may range from about 0.1 percent by weight to about 0.5 percent by weight. A halogen such as chlorine, fluorine, iodine or bromine may be present in the doped alloy layer in the range up to about 200 parts by weight per million. This layer generally ranges in thickness from about 15 micrometers to about 75 micrometers and preferably from about 25 micrometers to about 50 micrometers because of constraints imposed by the xerographic development system, constraints imposed by carrier transport limitations and for reasons of economics.

The charge generating layer 16 comprises a charge generating selenium-tellurium alloy photoconductive material. Excellent results may be achieved with alloys of selenium and tellurium. Generally, the selenium-tellurium alloy may comprise from about 55 percent by weight to about 95 percent by weight selenium and from about 5 percent by weight to about 45 percent by weight tellurium based on the total weight of the alloy. The thickness of the generator layer is typically about 3 micrometers to 5 micrometers. The selenium-tellurium alloy may also comprise other components such as less than about 5 percent by weight arsenic to minimize crystallization of the selenium and less than about 1000 parts per million by weight halogen.

Figure 1:
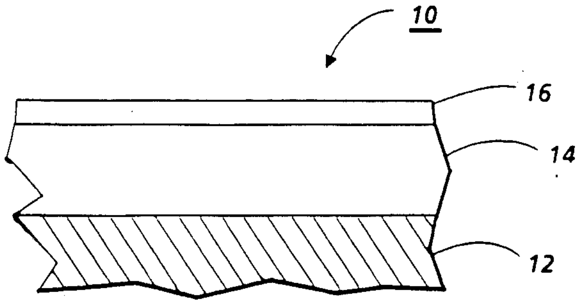
FIG. 1 graphically illustrates a multilayered photoreceptor comprising a charge generating layer and a transport layer supported on a conductive substrate.
Figure 2:
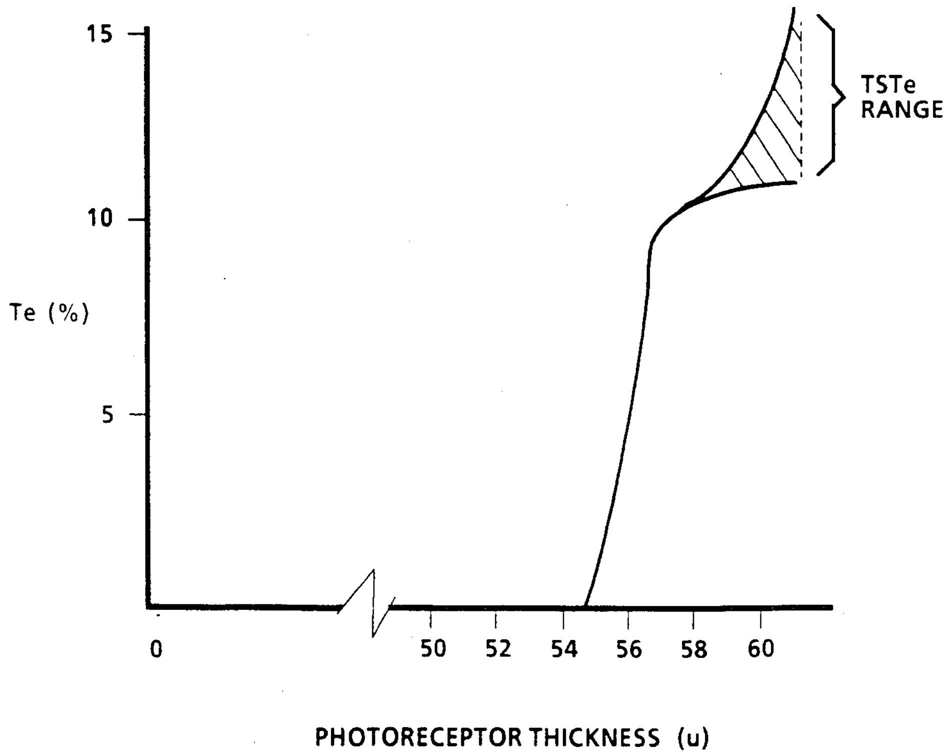
FIG. 2 graphically illustrates the range of top surface tellurium content observed in prior art processes.

Referring to FIG. 2, illustrates a typical tellurium concentration profile expected during deposition of a 5 micrometer thick selenium-tellurium photoreceptor layer. As the photoreceptor thickness approaches about 58 micrometers, the extreme top surface concentration of tellurium (TSTe) becomes less predictable and, for example, can vary as much as 5 percent by weight at thickness of about 61 micrometers. Since the minimum concentration of tellurium at a generation layer thickness at about 61 micrometer is about 11 percent, a batch exhibiting a 5 percent increase in tellurium concentration over an 11 percent tellurium batch amounts to a 45 percent increase in the total tellurium content in the generator layer. Fractionation describes the tellurium composition gradient that occurs in vacuum evaporation deposition of the selenium-tellurium alloy layer. Tellurium fractionation control is important because the local tellurium concentration at the extreme top surface of the structure (TSTe) directly affects xerographic sensitivity and copy quality. Thus, control of the fractionation of tellurium during the evaporation of the selenium-tellurium alloy layers is a key element in the fabrication of tellurium doped selenium photoreceptors. The grinding of selenium-tellurium alloy material into a fine powder followed by compression of the fine powder into pellets reduces tellurium fractionation (TSTe level). However, a perceived shortcoming of the structure of the photoreceptor described above with reference to FIG. 1 is the propensity of the selenium-tellurium alloy at the surface to crystallize under thermal exposure during extended machine service. To retard premature crystallization and extend photoreceptor life, the addition of up to 1 percent by weight arsenic to the selenium-tellurium alloy was found to be beneficial without impairment of xerographic performance. Unfortunately, the addition of arsenic to the selenium-tellurium alloy pellet composition impaired the capability of the pellet process to control tellurium fractionation. Selenium-tellurium-arsenic alloy pellets produced by grinding beads into a fine powder followed by pelletizing exhibited a wider variability of TSTe values, and a correspondingly wider distribution of photoreceptor sensitivity values than selenium-tellurium pellets produced by grinding into a fine powder followed by pelletizing. In one large photoreceptor preparation run, up to 50 percent of selenium-tellurium-arsenic pellets were rejected for high TSTe (excessive sensitivity).

Figure 3:
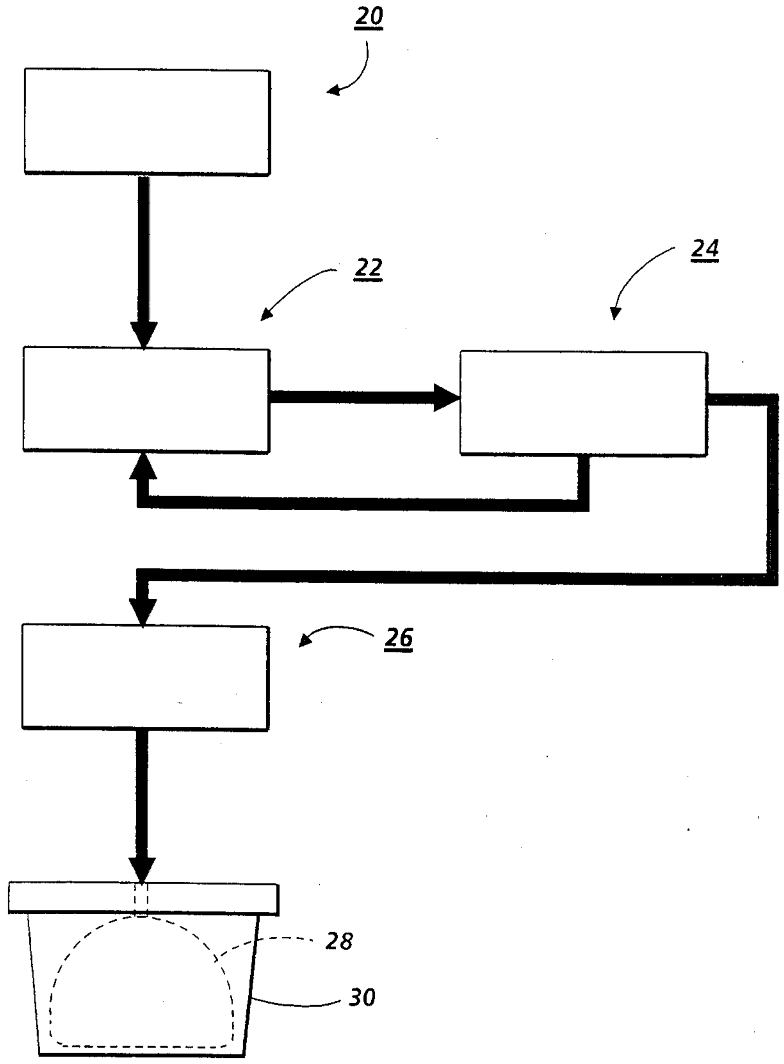
FIG. 3 schematically illustrates an embodiment of the process of this invention.

Referring to FIG. 3, an embodiment of the present invention is shown in which about 37.3 kg of selenium-tellurium-arsenic alloy beads comprising about 88 percent by weight selenium, about 11 percent by weight tellurium and about 1 percent by weight arsenic having an average particle size of about 2200 micrometers was tumbled in a mechanical blender 20 (Munson Blender, Model MX-55 Mina-Mixer, available from Munson Machinery Co.) for about 0.5 hour to about 1 hour to form alloy dust particles having an average particle size less than about 10 micrometers. The blender 20 comprised a horizontal cylinder having an inside diameter of about 50 cm. The cylinder was fitted with vanes extending axially along the length of the cylinder interior. The cylinder was rotated at about 2–5 rpm. Rotation of the cylinder caused the alloy beads to be carried upwardly by the vanes until the beads tumbled downwardly due to gravity. Less than about 20 percent of the alloy beads were fractured. Upon completion of the tumbling treatment, the alloy material was ground into a powder having an average particle size of about 30 micrometers in a hammer mill grinder 22 (Paudel Grinder, Model 2A, available from Fuji Industries, Japan) for about 5 minutes. The ground alloy powder was then compressed into pellets having an average weight of about 300 mg in a pelletizer 24 (Hata Pelletizer, Model HPT-22A, available from Hata Iron Works, Japan). The pellets had a thickness of about 3 mm and a diameter of about 6 mm. In another embodiment of this invention, about 9.3 kg of the pellets formed in the pelletizer 24 were tumbled in a 20 cm diameter glass jar roll mill 26 (available from Paul O. Abbe, Inc.) rotated at about 60 rpm for about 10 to 20 minutes. The pellets may optionally be recycled back through hammer mill grinder 22 and pelletizer 24. The resulting pellets were collected in a fabric bag 28 supported in a metal container 30.

The selenium-tellurium-arsenic alloy treatment of this invention overcomes the large batch to batch top surface tellurium concentration fluctuations in prior art photoreceptors which exhibited correspondingly large batch to batch variations in sensitivity that is unacceptable in high speed precision copiers, duplicators and printers. The process of this invention controls tellurium fractionation within narrow limits at higher yields. The combination of the manufacturing steps of this invention also reduces the tellurium distribution variation through the thickness of a photoconductive layer and controls the sensitivity of photoreceptors to light within narrow limits.

A number of examples are set forth herein below that are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

Two photoreceptor preparation control runs were made. Each run was conducted with batch of about 37.3 kg of selenium-tellurium-arsenic beads formed by water quenching droplets of a molten alloy comprising about 88 percent by weight selenium, about 11 percent by weight tellurium and 1 percent by weight arsenic, based on the total weight of the beads, and having an average particle size of about 2200 micrometers. Each batch was rapidly ground into a fine powder having an average particle size of about 30 micrometers in a hammer mill grinder (Paudel Grinder, Model 2A, available from Fuji Industries, Japan) for about 5 minutes. The ground alloy powder was then compressed into pellets having an average weight of about 300 mg in a pelletizer (Hata Pelletizer, Model HPT-22A, available from Hata Iron Works, Japan). Compression pressure in the pelletizer was about 15000 kg/cm$^2$ and the pellets had a length of about 3 mm and a diameter of about 6 mm. The resulting two batches of alloy pellets were thereafter employed to fabricate a plurality of control electrophotographic imaging members. The electrophotographic imaging members were prepared by evaporating the alloy beads onto an aluminum substrate previously vacuum coated with a chlorine doped selenium charge transport alloy material comprising about 100 percent by weight selenium and about 10 ppm chlorine, based on the total weight of the layer. This chlorine doped selenium alloy was evaporated from stainless steel crucibles at an evaporation temperature of between about 280° C. and about 330° C. and an evaporation pressure between about $4\times10^{-4}$ torr and $2\times10^{-5}$ torr. The aluminum substrates utilized were cylindrical and comprised an outer aluminum oxide layer having a thickness of about 10 Angstroms. The diameter of the aluminum cylinders was about 8 centimeters. The substrate temperature was maintained at about 60° C. during this evaporation coating operation. The resulting halogen doped selenium transport layer had a thickness of about 55 micrometers and contained about 100 percent by weight selenium and about 7 parts per million by weight chlorine. This transport layer coated substrate was thereafter coated with the selenium-tellurium-arsenic alloy pellets described above to form a charge generating photoconductive layer having a thickness of about 5 micrometers and containing about 11 percent by weight tellurium, about 1 percent by weight arsenic and the remainder selenium. This alloy was evaporated at a temperature of between about 300° C. and about 350° C. from stainless steel crucibles at a pressure of about $2\times10^{-5}$ torr. The resulting electrophotographic imaging members were tested in a test fixture which cycled the imaging members at a surface speed of about 13.9 cm/sec. The imaging mebers were first charged in the dark to a positive potential between about 900–1100 volts and exposed to an exposure source having spectral output in the blue region of the visible spectrum (about 470 nm) to reduce the potential to about 200 volts. Since the charge current was set prior to this test, the positive potential voltage acceptance levels were dependent upon the thickness of the imaging members. The variation in initial positive potential acceptance voltage of a typical imaging member may vary from about 0–20 volts. A charge acceptance voltage range of about 900 to 1100 volts will provide good performance in automatic copiers. This range of positive potential voltages normally produces excellent solid area copy quality with no visible variation in density across the image for the first copy. The imaging members were then erased by uniform exposure to an array of neon lamps with a peak output in the green region (about 520 nm) of the visible spectrum. The sensitivity response of photoreceptors to light exposure of varying wavelength is generally measured by correlating initial dark development potential (P) and exposure light (l) at varying potential levels according to the relationship:

$$\sqrt{P}=a-Sl$$

where the parameter (a) is an empirical constant and where the parameter (S) characterizes the sensitivity of the development potential to light intensity. In this example, the value of S from one batch was calculated as 550 whereas the value of S for the second batch was calculated as 620. This was a difference of about 13 percent. Large batch-to-batch variations in photoreceptor sensitivity index are undesirable in automatic copiers, duplicators and printers because it induces unacceptable variability in print copy quality.

Extremely low values of the sensitivity parameter S can lead to loss of print line resolution due to underexposure of light, whereas extremely high values of the sensitivity parameter S can lead to imaging defects known as "ghosting". Generally, there is a limited range of sensitivity parameter variation for specific xerographic systems. For the example cited, the minimum and maximum range for the sensitivity parameter was 370 and 540. All photoreceptors fabricated for this specific example application should lie within these limits. It is known that the concentration of tellurium at the top surface of the photoreceptor has a marked effect on the value of the sensitivity parameter, values of the sensitivity parameter S increasing with increase in top surface tellurium content.

The photoreceptors from the two batches were tested for top surface concentration of tellurium. Testing was effected by detaching the deposited film from the substrate and determining the tellurium concentration at the top surface by X-ray diffraction. It was discovered that the top surface of the photoreceptors from the first batch had a tellurium concentration of about 15.5 Percent by weight whereas the second batch had a tellurium concentration of 16.4 percent by weight. This was a difference of 0.9 percent in tellurium content.

EXAMPLE II

Electrophotographic imaging members of this invention were prepared with two batches of alloy bead materials identical to the alloy bead materials described in Example I. The procedures employed to fabricate the electrophotographic imaging members of this invention were identical to the procedures described in Example I except that additional steps were utilized during the treatment of one-half of each of the alloy bead batches prior to vacuum evaporation to form the alloy layers. More specifically, one-half of each of two 37.3 kg batches of selenium-tellurium-arsenic beads from the same lot as the beads used in Example I, were tumbled in in a mechanical blender (Munson Blender, Model MX-55, available from Munson Machine Co.) for about 1 hour to form alloy dust particles having an average particle size of less than about 10 micrometers. The blender comprised a horizontally disposed cylinder having an inside diameter of about 50 cm. The cylinder was fitted with vanes having a height of about 4 cm extending axially along the length of the cylinder interior. The cylinder was rotated at about 2 rpm. Rotation of the cylinder caused the alloy bead particles to be carried upwardly by the vanes until the bead particles tumbled downwardly due to gravity. No crushed bead particles were observed in the material in either of the batches removed from the blender after tumbling after each run. Upon completion of the tumbling treatment, the alloy material from each batch was separately ground into a powder having an average particle size of about 30 micrometers in a hammer mill grinder (Paudel Grinder, Model 2A, available from Fuji Industries, Japan) for about 5 minutes. The ground alloy powder of each batch was then separately compressed into pellets having an average weight of about 300 mg in a pelletizer (Hata Pelletizer, Model HPT-22A, available from Hata Iron Works, Japan). The pellets had a length of about 3 mm and a diameter of about 6 mm. The remaining portions of the batches of selenium-tellurium-arsenic beads were heated identically as described in Example I, i.e. the mechanical tumbling step was eliminated. The alloy bead grinding and pelletizing procedures for each fraction of the split batches were identical. The resulting split fractions of tumbled and non-tumbled pellets were thereafter deposited in separate runs using procedures identical to that described in Example I. The photoreceptors from the two segments of the original alloy batches were tested for electrical sensitivity parameters as described in Example 1. The results of the test are set forth in Table I below.

TABLE I

| Batch No. | Sensitivity Parameter S | |
|---|---|---|
| | Non-Tumbled Pellets | Tumbled Pellets |
| 1 | 540 | 520 |
| 2 | 570 | 520 |

The results of the additional pellet tumbling treatment was to reduce the sensitivity parameter to within the acceptable range as well as reduce the batch-to-batch variability.

EXAMPLE III

Electrophotographic imaging members of this invention were prepared with three batches of alloy bead materials identical to the alloy bead materials described in Example I. The procedures employed to fabricate the electrophotographic imaging members of this invention were identical to the procedures described in Example I except that an additional step was utilized during the treatment of one-half of each of the three alloy bead batches. More specifically, a portion of each of three 37.3 kg batches of selenium-tellurium-arsenic materials were subjected to a mechanical tumbling step after being processed into fine powder and compacted into pellets. Specifically, all of the three batches of selenium-tellurium-arsenic beads were rapidly ground to fine powder having an average particle size of about 30 micrometers in a hammer mill grinder (Paudel Grinder, Model 2A, available from Fuji Industries, Japan) for about 5 minutes. The ground alloy powder was then compressed into pellets having an average weight of about 300 mg in a pelletizer (Hata Pelletizer, Model HPT-22A), available from Hata Iron Works, Japan). Compression pressure in the pelletizer was about 15,000 kg/cm$^2$ and the pellets had a thickness of about 3 mm and a diameter of about 6 mm. A fraction averaging 93 kg from each of the three batches of pellets were then tumbled in a 20 cm diameter glass jar roll mill (available from Paul O. Abbe, Inc.) rotated at about 60 rpm for 20 minutes. The resulting three portions of tumbled pellets and three portions of non-tumbled pellets from the three split batches were thereafter employed to fabricate a plurality of electrophotographic imaging members using procedures identical to that described in Example I. The results of the tests of this Example III are set forth in Table II below:

TABLE II

| Batch No. | Sensitivity Parameter S | |
|---|---|---|
| | Non-Tumbled Pellets | Tumbled Pellets |
| 3 | 560 | 550 |
| 4 | 540 | 530 |
| 5 | 540 | 530 |

The results of the additional pellet tumbling step was to reduce the sensitivity parameter 10 to 20 sensitivity units.

EXAMPLE IV

Electrophotographic imaging members of this invention were prepared with seven batches of alloy bead materials identical to the alloy bead materials described in Example I. The procedures employed to fabricate electrophotographic imaging members were identical to the procedures described in Example I except that the batches were split into segments. One portion of each of the seven alloy bead batches was subjected to a mechanical tumbling procedure identical to the procedure described in Example II. Portions of each of the alloy bead batches of were then ground to fine powder and pelletized using the procedures described in Examples I, II, and III. Finally, several of the alloy batches were mechanically tumbled after pelletizing using a procedure identical to the procedure described in Example III. The resulting segments of selenium-tellurium-arsenic alloy batches variously mechanically tumbled in the alloy bead form prior to pelletizing or mechanically tumbled in the pellet form after pelletizing or not tumbled in either format were thereafter employed in separate runs to fabricate a plurality of electrophotographic imaging members using procedures identical to that described in Example I. The photoreceptors fabricated from the alloy/pellet materials as variously treated were tested for electrical sensitivity as described in Example I. The results of the tests of photoreceptors of this Example IV are set forth in Table III below:

TABLE III

| | Sensitivity Parameter S | | |
|---|---|---|---|
| | Non-Tumbled Condition | Tumbled Beads | Tumbled Pellets |
| Mean | 555 | 513 | 542 |
| Standard Deviation | 24.0 | 12.4 | 17.4 |

Both the mechanically tumbled beads and pellets yielded photoreceptors exhibiting significantly reduced sensitivity parameters as well as smaller standard deviation than the non-tumbled material.

Although the invention has been described with reference to specific preferred embodiments, it is not intended to be limited thereto, rather those skilled in the art will recognize that variations and modificatons made be made therein which are within the scope of the invention and within the scope of the claims.

What is claimed is:

1. A process for preparing a selenium material for increased control of tellurium fractionation during vacuum deposition of a selenium alloy layer in an electrophotographic imaging member comprising providing large particles of an alloy comprising selenium, tellurium and arsenic, said large particles having an average particle size of at least 300 micrometers and an average weight less than about 1000 mg, mechanically abrading the surfaces of said large particles while maintaining the substantial surface integrity of said large particles to form between about 3 percent by weight to about 20 percent by weight alloy dust particles based on the total weight of said alloy prior to mechanical abrasion, said dust particles having an average particle size of less than about 10 micrometers.

2. A process according to claim 1 wherein said alloy dust particles are substantially uniformly compacted around the outer periphery of said large particles of said alloy.

3. A process according to claim 1 wherein said large particles of said alloy are beads of said alloy having an average particle size of between about 300 micrometers and about 3,000 micrometers.

4. A process according to claim 1 wherein said large particles of said alloy are pellets having an average weight between about 50 mg and about 1000 mg, said pellets comprising compressed finely ground particles of said alloy having an average particle size of less than about 200 micrometers prior to compression.

5. A process for increasing control of tellurium fractionation during vacuum evaporation of a layer in an electrophotographic imaging member comprising providing beads of an alloy comprising selenium, tellurium and arsenic having an average particle size of between about 300 micrometers and about 3,000 micrometers, mechanically abrading the surface of the beads while fracturing less than about 20% by weight of said beads to form a minor amount of dust particles of said alloy, said dust particles having an average particle size of less than about 10 micrometers, grinding said beads and said dust particles to form finely ground particles of said alloy having an average particle size of less than about 200 micrometers, and compressing said ground particles into pellets having an average weight between about 50 mg and about 1000 mg.

6. A process according to claim 5 wherein said dust particles comprise between about 3 percent by weight to about 20 percent by weight of the total weight of said alloy prior to mechanical abrasion.

7. A process according to claim 5 wherein less than about 20 percent by weight of said alloy beads, based on the weight of the total alloy, is fractured while mechanically abrading said surfaces of said beads.

8. A process according to claim 5 including grinding said pellets to form additional ground particles of said alloy having an average particle size of less than about 200 micrometers and compressing said additional ground particles into pellets having an average weight between about 50 mg and about 1000 mg.

9. A process according to claim 5 including tumbling said pellets until a minor amount of dust particles of said alloy from said pellets is formed, said dust particles of said alloy from said pellets having an average particle size of less than about 10 micrometers.

10. A process according to claim 9 including tumbling said pellets while maintaining the substantial surface integrity of said pellets, said dust particles of said alloy from said pellets comprising from about 3 percent by weight to about 20 percent by weight of said alloy, based on the total weight of said pellets prior to tumbling.

11. A process for according to claim 5 wherein said selenium-tellurium-arsenic alloy consists essentially of between about 5 percent by weight and about 45 percent by weight tellurium, between about 0.1 percent by weight and about 5 percent by weight arsenic, less than about 50 parts per million by weight halogen all based on the total weight of said alloy with the remainder being selenium.

12. A process according to claim 5 including vacuum depositing a layer of said selenium-tellurium-arsenic alloy from said pellets on to a substrate.

13. A process according to claim 12 wherein said substrate comprises a supporting member and a charge transport layer comprising selenium.

14. A process for providing increase control of tellurium fractionation during a vacuum deposition of selenium material for electrophotographic imaging members comprising providing beads of an alloy comprising selenium, tellurium and arsenic having an average particle size of between about 300 micrometers and about 3,000 micrometers, grinding said beads to form finely ground particles of said alloy having an average particle size of less than about 200 micrometers, comprssing said ground particles into pellets having an average weight between about 50 mg and about 1000 mg, and tumbling said pellets while fracturing less than about 5% by weight of said pellets to form a minor amount of dust particles of said alloy, said dust particles of said alloy from said pellets having an average particle size of less than aout 10 micrometers and comprising from about 3 percent by weight to about 20 percent by weight of said alloy, based on the total weight of said pellets prior to tumbling.

* * * * *